W. S. Howarth,
Pipe Cutter.

Nº 52,715. Patented Feb. 20, 1866.

Witnesses.
Anson Munson

Inventor
Wm S Howarth

UNITED STATES PATENT OFFICE.

WILLIAM S. HOWARTH, OF NEW HAVEN, CONNECTICUT.

IMPROVED TOOL FOR CUTTING GAS-PIPES, &c.

Specification forming part of Letters Patent No. 52,715, dated February 20, 1866.

*To all whom it may concern:*

Be it known that I, WILLIAM S. HOWARTH, of the city and county of New Haven, in the State of Connecticut, have invented a new and useful Improvement in Tools for Cutting Gas-Pipes, &c.; and I do hereby declare that the following is a full, clear, and exact description of the construction, character, and operation of the same, reference being had to the accompanying drawings, which make part of this specification, in which—

Figure 1:
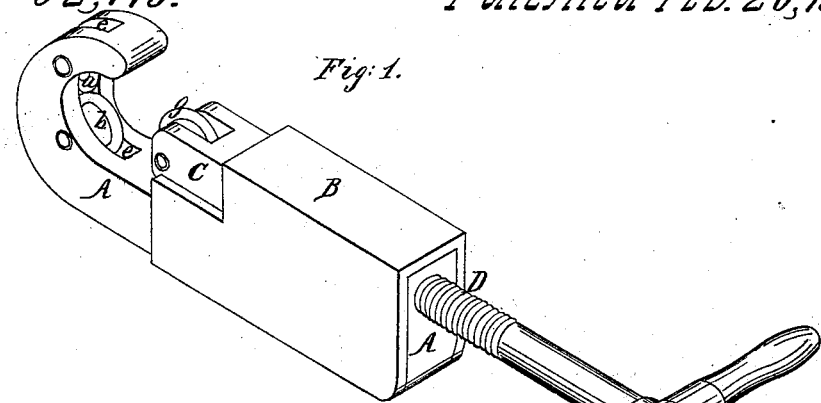
Figure 2:
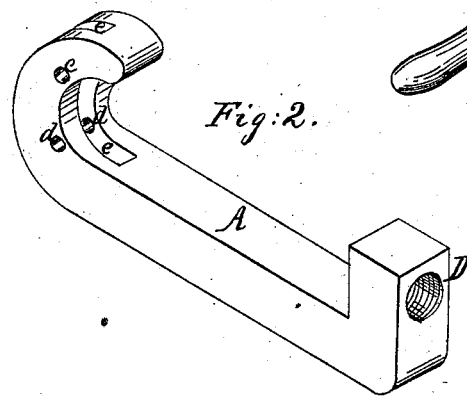
Figure 3:
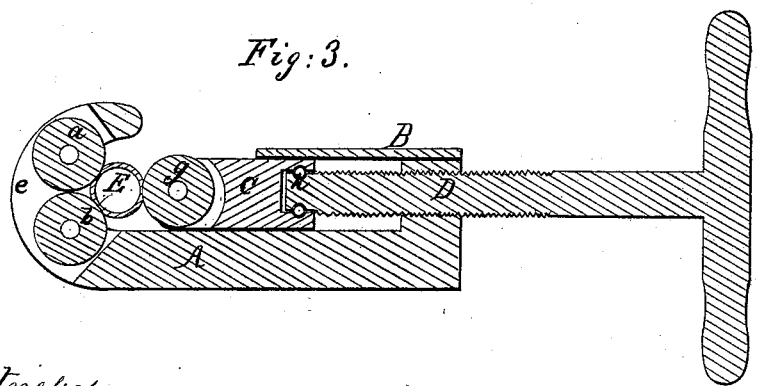

Figure 1 is a perspective view of the tool complete, showing the three cutters in their relative positions. Fig. 2 is a perspective view of the main or body part of the tool detached from the part in which the moving cutter slides. Fig. 3 is a section of Fig. 1, cut longitudinally through the center, showing the relative positions of the several parts, while cutting off a pipe, and the pipe as cut off.

My improvement consists in making the tool with three revolving plain cutters set in such a manner or relation to each other that the three axes or centers of rotation will occupy the position of the three angles of an isosceles triangle, two of these axes or fulcra being in the stationary part or body and fixed, as respects themselves and the other adjustable cutter, by a screw in a line toward or from, so that the pipe to be cut may be held equally between them to whatever position the movable cutter may be adjusted, so that the cutters may cut equally.

I make the stationary or main part of wrought-iron or any other suitable material, substantially in the form shown in Fig. 2 and indicated at A, Figs. 1 and 3, so as to fit the case B, which receives and steadies the movable part C, Figs. 1 and 3.

In the rear or outer end I tap or cut a female thread or screw to receive the adjusting male screw D, Figs. 1 and 3, as shown in Fig. 2 and at the front or cutting end I fit two plain cutters, $a$ and $b$, Figs. 1 and 3, and as indicated by the holes $c$ and $d$, Fig. 2.

The space $e$, in which the cutters $a$ and $b$ are inserted, may be cut with a saw or otherwise, as found convenient.

I make the movable part to receive the adjustable cutter of wrought-iron or any other suitable material, substantially of the form shown at C, Fig. 1, and indicated in section at C, Fig. 3, with a proper space to receive the adjustable cutter $g$, Figs. 1 and 3, and a space or recess to receive the inner end of the screw D, as indicated in section in Fig. 3, to adjust the cutter $g$ to the necessary position for use.

I make the three cutters $a$, $b$, and $g$, Figs. 1 and 3, of cast-steel in the ordinary shape for revolving cutting-disks, and secure them in the parts A and C on proper axes, all as shown or indicated in Figs. 1 and 3.

I make the adjusting-screw D (for adjusting the cutter $g$) as shown in Figs. 1 and 3, and connect it with the stock C of the adjustable cutter $g$ by a suitable pin, $h$, as indicated in Fig. 3.

Having made and arranged the several parts as above described, I apply the tool to the pipe to be cut as indicated in section at E, Fig. 3, adjust the cutter $g$ as required, and vibrate the tool or instrument on the pipe E, varying the adjustment as needed, until the pipe is severed, as indicated at E, Fig. 3.

The advantages of my improvement consist in that it may be used to cut a pipe while on a wall or ceiling wherever it can be vibrated as much as one-third of a circle, and in that it will cut three times as fast as any heretofore used.

What I claim as my invention, and desire to secure by Letters Patent, is—

The use of the two fixed cutters $a$ and $b$, in combination with the adjustable cutter $g$, when the whole is constructed and fitted for use substantially as herein described and set forth.

WM. S. HOWARTH.

Witnesses:
ANSON MUNSON,
R. FITZGERALD.